United States Patent

Hoerst

[15] 3,648,800

[45] Mar. 14, 1972

[54] COANDA EXPANSION EXHAUST NOZZLE SUPPRESSOR

[72] Inventor: Donald J. Hoerst, Fairfield, Ohio
[73] Assignee: General Electric Company
[22] Filed: Apr. 27, 1970
[21] Appl. No.: 32,186

[52] U.S. Cl.....................181/33 HC, 181/33 HD, 181/51, 239/265.17, 239/265.19
[51] Int. Cl................B64d 33/06, F01n 1/14, F01n 1/16
[58] Field of Search...............181/33, 43, 51, 33.22, 33.221, 181/33.222; 239/265.11, 265.33, 265.13, 265.37, 265.17, 265.39, 127.3, 265.41, 265.19

[56] References Cited

UNITED STATES PATENTS

| | | | |
|---|---|---|---|
| 3,347,466 | 10/1967 | Nichols | 181/33 HD |
| 3,568,792 | 3/1971 | Urquhart | 239/265.13 |
| 3,484,847 | 12/1969 | Poole | 181/33 HD |
| 2,934,889 | 5/1960 | Poulos | 181/33 HD |
| 3,020,712 | 2/1962 | Dolliver | 181/33 HD |
| 3,455,413 | 7/1969 | Henley | 239/265.13 |
| 3,463,402 | 8/1969 | Langston | 181/33 HD |
| 3,443,757 | 5/1969 | Townend | 239/265.13 |
| 3,527,318 | 9/1970 | Duthion et al. | 239/265.13 |

FOREIGN PATENTS OR APPLICATIONS

| | | | |
|---|---|---|---|
| 1,247,750 | 8/1967 | Germany | 181/33 HC |
| 1,301,341 | 8/1969 | Germany | 181/33 HC |
| 886,201 | 1/1962 | Great Britain | 181/33 HC |

*Primary Examiner*—Robert S. Ward, Jr.
*Attorney*—Derek P. Lawrence, Thomas J. Bird, Jr., Lee H. Sachs, Frank L. Neuhauser, Oscar B. Waddell and Joseph B. Forman

[57] ABSTRACT

An exhaust nozzle of an aircraft gas turbine engine is provided with a plurality of speed pods which are spaced around the periphery thereof. The pods are generally cone shaped with longer pods being positioned at the top of the nozzle in order to present an acoustic lens to the jet wake which causes the directivity of the angle of maximum noise to change with the overall result being a reduction in noise at ground level. At least one of the pods would be translatable axially in order to vary the exhaust pressure ratio of the nozzle.

6 Claims, 8 Drawing Figures

PATENTED MAR 14 1972

INVENTOR.
DONALD J. HOERST

BY

*T. J. Bird, Jr.*
AGENT

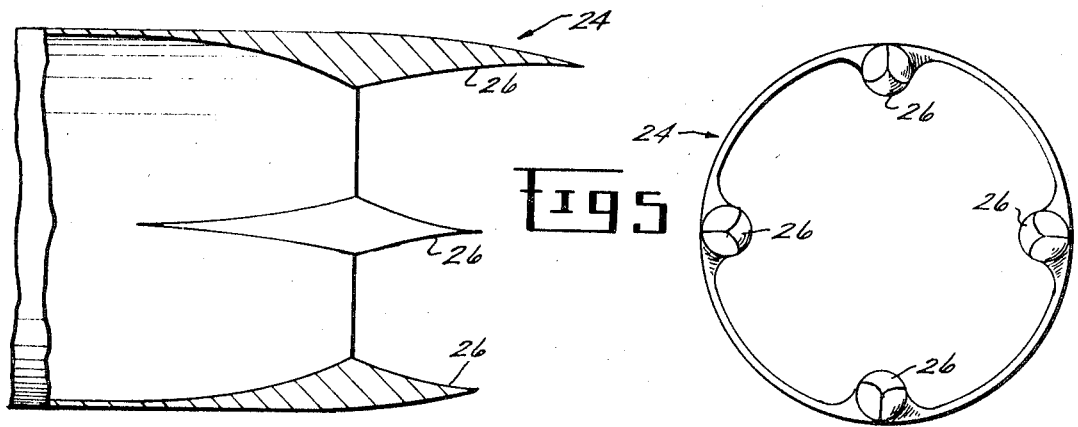
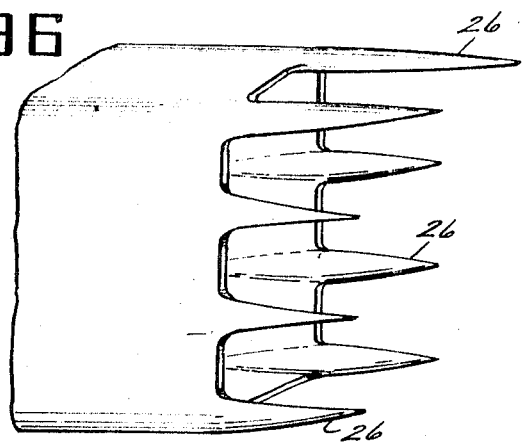
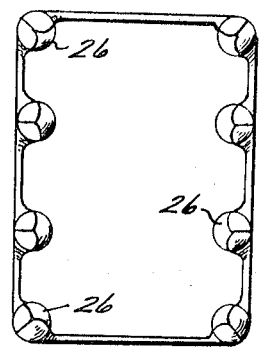
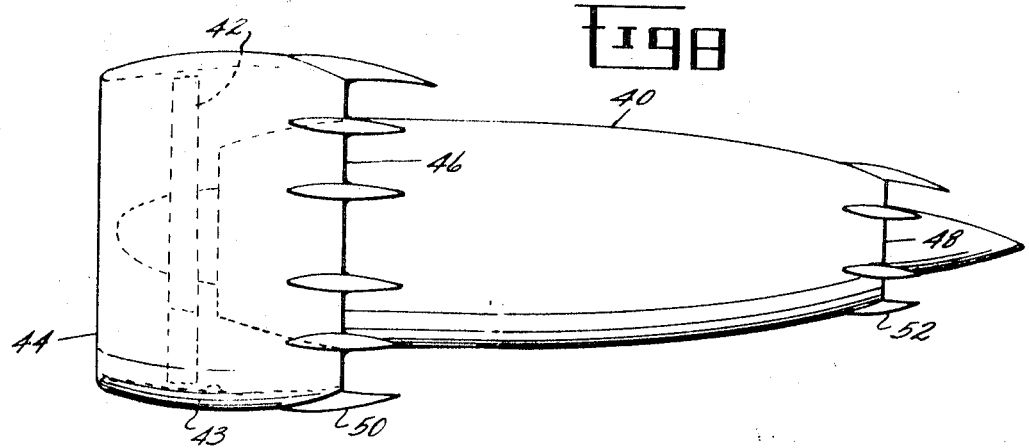

COANDA EXPANSION EXHAUST NOZZLE SUPPRESSOR

BACKGROUND OF THE INVENTION

This invention relates to gas turbine engine exhaust nozzles and, more particularly, to silencers for use therewith.

In recent years the noise levels generated by gas turbine powered aircraft have created noise problems for those people who are situated close enough to airports to be affected thereby and also for the aviation industry in general and particularly for gas turbine engine manufacturers who have tried to eliminate the problem. The use of turbine powered aircraft has become so commonplace that the Federal government, through the Federal Aviation Administration, has implemented noise level standards which must be met by aircraft and gas turbine manufacturers before an aircraft powered by the gas turbine engine will be certified. A great deal of work has therefore taken place in an attempt to reduce the noise levels associated with gas turbine powered aircraft. In spite of this vast amount of time and work which have been spent in an attempt to solve this problem, however, noise levels remain undesirable.

SUMMARY OF THE INVENTION

It is an object of this invention, therefore, to provide an exhaust nozzle for high exhaust pressure ratio, high temperature gas turbine engines having improved acoustic properties while reducing costs and boosting performance over nozzles presently proposed.

Briefly stated, the object of this invention is carried out by providing an exhaust nozzle with a plurality of speed cones or pods around the periphery thereof. The cones vary in length with the longest being located at the top of the nozzle in order to present an acoustic lens to the jet wake which causes the directivity of the angle of maximum noise to change with the high intensity sound being concentrated upwardly. At least one of the cones would be translatable axially in order to optimize suppression characteristics while permitting the adjustment of the exhaust pressure ratio across the exhaust nozzle.

DESCRIPTION OF THE DRAWINGS

The above and other related objects and features of the invention will become apparent from a reading of the following description of the disclosure, which is given in light of the accompanying drawings, with the novelty thereof being pointed out in the appended claims.

In the drawings:

FIG. 4 is an enlarged, side view of an exhaust nozzle constructed in accordance with this invention;

FIG. 5 is the end view of the exhaust nozzle of FIG. 4;

FIG. 6 is a schematic view of a rectangular exhaust nozzle constructed in accordance with this invention;

FIG. 7 is the end view of the exhaust nozzle of FIG. 6; and

FIG. 8 is a schematic view of a front fan, high bypass engine incorporating a silencer constructed in accordance with this invention.

DESCRIPTION OF A PREFERRED EMBODIMENT

Figure 1:
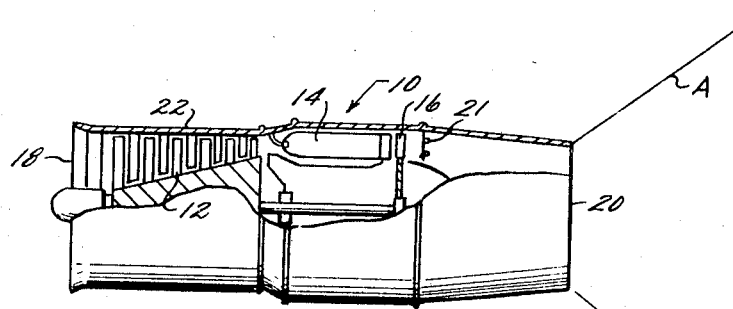
FIG. 1 is a schematic view of a gas turbine engine of conventional design illustrating the manner in which noise is propagated therefrom.

Referring to the drawings wherein like numerals correspond to like elements throughout, reference is first made to FIG. 1 for a better understanding of the general problems involved with the propagation of noise from a gas turbine engine. FIG. 1 shows, in simplified fashion, a gas turbine engine 10, comprising a compressor 12, a combustion system 14, and a turbine 16 having a rotor portion mechanically connected to the compressor 12 for driving the same. As is generally well known in the art, ambient air enters an inlet 18 and is compressed by the compressor 12, ignited along with a high temperature fuel in the combustor 14, and performs work by driving the turbine 16. The remaining high energy gas stream is expanded by an exhaust nozzle 20 to provide a propulsive force for propelling an aircraft to which the gas turbine engine is attached. Additional fuel is often added upstream in the exhaust nozzle 20 by means of an augmenter fuel system 21 in order to increase exhaust gas velocity and thereby provide a higher thrust output from the engine 10.

A high energy noise level generated within a casing or duct 22 which surrounds the engine 10 radiates from the exhaust nozzle 20 in such a manner that the angle of maximum noise level is a cone, labeled A, of relatively wide divergence as is schematically shown in FIG. 1. It should be readily apparent that with this wide angle of propagation the sound waves have a very short path to travel to reach any populated areas over which an aircraft would pass, especially when the aircraft is approaching or taking off from an airport.

Figure 2:
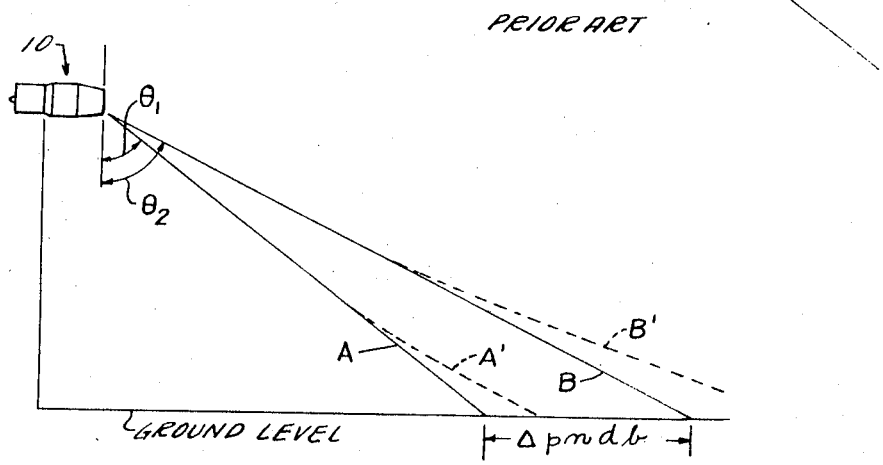
FIG. 2 is a schematic view of a gas turbine engine showing the effect of a slight change in noise propagation angle.

Referring now to FIG. 2 it can be shown that a small change in directivity can result in a relatively large change in maximum noise level and duration existing at ground level. For example, a jet noise stream A having an angle of propagation of $\Theta_1$ is shown to have a certain path length to travel to reach ground level. If the angle is increased just slightly to $\Theta_2$, the resulting jet noise stream B has a path length which has changed significantly with a corresponding reduction in noise intensity seen at ground level. The reduction in intensity is schematically labeled $\Delta$ pndb. Additionally, it has been shown that the temperature gradient between an aircraft and the ground causes a slight bending of the angle of maximum jet noise. The effects of the temperature gradient are shown by the dotted lines A' and B' of FIG. 2. The effects of the temperature gradients have been shown to be more pronounced as the angle $\Theta$ increases. This results in a further reduction in noise intensity at ground level.

Figure 3:
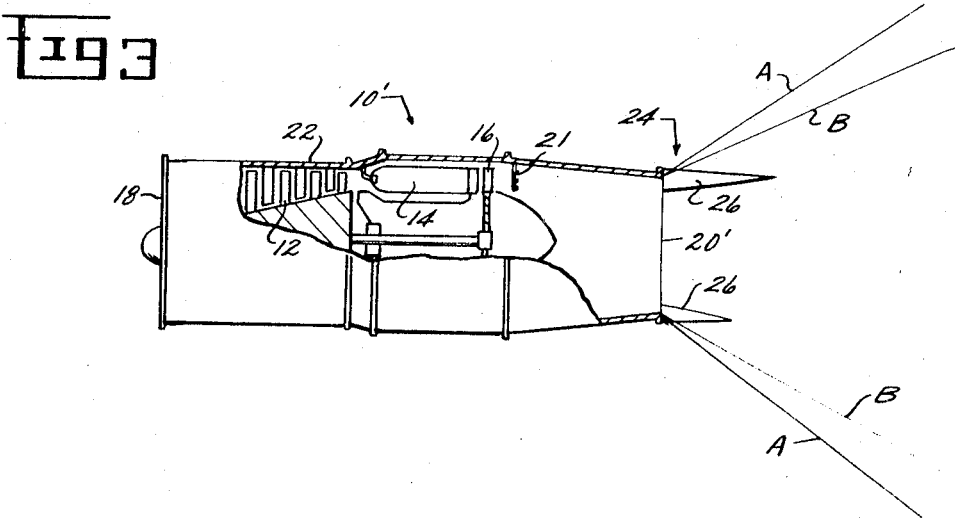
FIG. 3 is a schematic view of a gas turbine engine incorporating an exhaust nozzle constructed in accordance with the present invention and illustrating schematically the manner in which noise propagation therefrom is changed.

The applicant's present invention is directed to an exhaust nozzle which will provide an increase in the angle $\Theta$, i.e., an increase in the angle of propagation of maximum noise from a gas turbine engine. FIG. 3 illustrates schematically the effects of the present invention in redirecting the directivity of noise propagation from the gas turbine engine exhaust nozzle. A gas turbine engine 10', illustrated therein, is similar to the engine 10 shown in FIG. 1 with the exception that means are provided for concentrating high intensity sound upwardly. These means increase the area of the jet plume with a minimum of turbulence as the "Greatrex" nozzle forms, which have been used for a number of years are supposed to do. Persons familiar with the art will realize that presently used "Greatrex" nozzle forms normally result in a reduction of the thrust level generated by the gas turbine engine. The proposed nozzle depicted in FIGS. 3 and 4, however, differs from previously used "Greatrex" nozzles in that the "Greatrex" nozzle increases the shear area of the exhaust plume by impeding certain portions of the flow with some structural member. In contrast with this, the exhaust nozzle shown in FIGS. 3 and 4 increases the shear area of the exhaust plume by means of the Coanda effect.

That is, the gas turbine engine 10' is provided with a Coanda expansion silencer, generally designated by the numeral 24, which comprises a plurality of speed cones or pods 26 located around the periphery of an exhaust nozzle 20'. The speed cones or pods 26 are shaped in the form of cones with their apex being located at or downstream of the downstream end of the exhaust nozzle 20' and their bases being faired into the exhaust nozzle wall in order to provide a smooth transition surface. The speed cones 26 vary in axial length with the longest being located at the top of the exhaust nozzle 20', as is clearly shown in FIG. 4. The overall effect of the varied length cones represents an acoustic lens to the jet exhaust causing the directivity to change and thereby reducing noise intensity at ground level. The speed cones 26 could have a fixed geometry, but in a preferred embodiment, at least one of the speed cones 26 would be translatable axially, thereby optimizing the directivity change. In addition, the translatable cones would provide means for inexpensively adjusting the pressure ratio across the exhaust nozzle 20'.

As previously mentioned, the Coanda effect is utilized to provide the necessary velocity gradients to produce the desired acoustic lens effect. In other words, the speed cones 26 are designed so that the jet exhaust attaches to each cone as it leaves the duct 22. The overall effect of this is to break up the single jet plume into a plurality of smaller jet plumes of different sizes, each of which is attached to one of the speed cones 26. This effect by itself produces the following results: First, the plurality of smaller jet plumes shifts the noise frequency spectrum higher thereby removing a portion of the noise energy from the audible range and also permitting one to take advantage of the greater air attenuation of sound at higher frequencies. Secondly, the multi-plumes cause a reactive boundary for the near field pressure fluctuation and turbulences which restrict the generation of acoustic waves. Thirdly, the multi-plumes cause a condition wherein the sound is generated in proportion to less than the sixth power of the exhaust gas velocity whereas a common noise suppressor permits acoustic energy generated to be proportional to the eighth power of the exhaust gas velocity.

When the exhaust gases attach to the speed cones 26, the radial component of flow along with the Coanda attached flow causes a stream to envelope each of the cones 26. When the exhaust gases flow in the region of each cone, there is thus generated a swirl motion or vortex component around each of the terminals. It is from the above that the following acoustic benefits are derived:

The turbulence which results from the high velocity flow attached to the speed cones 26 is caused to converge since it propagates down the cones 26 which are reducing in diameter. Thus, the eddy size is stabilized at a minimum value, the boundary is reactive, the acoustic waves give up a certain amount of energy in producing heat and the shock pattern is distorted. All of the above would result in a reduction in noise intensity. In addition to the above, there would be a reduction of the bursts or pulses of low frequency noise due to jet spurts since the speed cones 26 more effectively couple the exhaust stream to the surrounding medium.

In addition to the above, by making the speed cones 26 located at the top of the nozzle longer than those located at the bottom, the velocity of flow which remains attached to the top cones is higher than that which has already come unattached at the bottom of the nozzle. This causes the directivity of the jet wake to converge. Since the jet plume with the least energy will be defracted the most, a nozzle with the concentration of flow toward the top thereof would result in the maximum intensity angle of the sound being reflected upwardly.

In the past, so called "daisy" nozzles have been produced in order to reduce noise associated with a gas turbine engine. The basic purpose of the "daisy" was to increase the locus of the nozzle exit periphery and thereby reduce the shear gradients associated with the flow from the nozzle. The speed cones 26 also reduce the shear gradients, but, more importantly, the speed cones 26 minimize the turbulence downstream of the nozzle. Jet noise has been shown to be a function of both high shear velocity and also high turbulence. The overall effect of Applicant's nozzle will thus be to reduce noise to a greater degree than that of a conventional daisy nozzle.

As shown in FIGS. 4 and 5, the speed cones 26 may be positioned around the periphery of a conventional circular nozzle. However, it has been shown that the most efficient sound reduction takes place when the separate jet plumes generated by the speed cones 26 are located approximately one diameter apart. For this purpose, a rectangular nozzle, similar to the one shown in FIG. 6, may be desirable. This would permit optimum separation of the speed cones 26 and would thus maximize suppression. This configuration would also make possible a simplified thrust reverser mechanism, thus reducing the overall cost of the gas turbine engine. The configuration shown consists of a rectangle having its long dimension in the vertical direction. While eight speed cones 26 are shown, the number and positioning thereof would depend upon engine operating and noise level characteristics.

As shown in FIG. 8, Applicant's invention would be readily adaptable for use with a high bypass, fan type engine. This type of engine consists of a core engine, generally designated by the numeral 40, and a large diameter fan designated by the numeral 42, which is generally located at the front portion of the core engine 40. The large diameter fan 42 is located within a short duct 43 having an inlet 44 and an outlet 46. The fan 42 is normally driven by a low pressure turbine and compressor located within the core engine 40. The core engine 40 also has associated with it an inlet (not shown) and an outlet 48.

As shown in FIG. 8, both the outlet 46 of the fan duct 43 and the outlet 48 of the core engine 40 could have associated therewith silencers constructed in accordance with this invention. Thus, the outlet 46 has a plurality of speed cones 50 located around the periphery thereof, while the outlet 48 has a plurality of speed cones 52 located around its periphery. The overall effect of the speed cones would again be to break up the outer periphery of exhaust flow into a plurality of small jet plumes, thus reducing broad band noise levels. Empirical data would have to be generated in order to determine the optimum size and configuration of the speed cones. It should be readily apparent from the above description, however, that applicant has described a nozzle which is capable of breaking the exhaust flow up into individual plumes without the necessity of movable blocker doors or other mechanical structures. This results in both a savings of weight and cost while providing higher noise level reduction than that associated with presently used nozzles.

What I claim is:

1. A noise suppressing exhaust nozzle for an aircraft gas turbine engine which generates a propulsive gas stream, said nozzle comprising:
   ducting having an inner wall along which the propulsive gases are directed to atmosphere;
   a plurality of speed pods spaced around the periphery of said ducting, said speed pods having upstream ends faired into said inner wall to provide a smooth surface therewith;
   said speed pods having different axial lengths with the longest of said speed pods being located at the top of said ducting; and
   said speed pods providing an extension of said ducting such that propulsive gases flowing along said inner wall attach to said pods whereby the propulsive gas stream emanating from said nozzle is broken up into a plurality of small plumes, each of which is attached to one of said speed pods.

2. An exhaust nozzle as recited in claim 1 wherein said speed pods comprise cone shaped members having their apexes located at or downstream of the downstream end of said ducting.

3. An exhaust nozzle as recited in claim 2 wherein at least one of said pods is translatable axially.

4. An exhaust nozzle as recited in claim 2 wherein said ducting is generally rectangular shaped.

5. An exhaust nozzle as recited in claim 4 wherein said rectangular shaped nozzle has its long dimension in a vertical direction.

6. An exhaust nozzle as recited in claim 2 wherein said ducting comprises a fan duct surrounding the fan portion of a turbofan engine.

* * * * *